United States Patent
Critsinelis et al.

(10) Patent No.: US 8,708,602 B2
(45) Date of Patent: Apr. 29, 2014

(54) SYSTEM AND METHODS FOR STABILIZING SUBSEA PIPELINE

(75) Inventors: Antonio Carlos Falcao Critsinelis, Kingwood, TX (US); Sid A. Mebarkia, Sugar Land, TX (US); Robert L. Foster, Jr., Houston, TX (US); Michael J. Quinney, Belleville, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 13/339,605

(22) Filed: Dec. 29, 2011

(65) Prior Publication Data
US 2013/0170914 A1    Jul. 4, 2013

(51) Int. Cl.
*F16L 1/16*    (2006.01)

(52) U.S. Cl.
USPC ..... 405/172; 405/158; 405/168.1; 405/168.2; 405/184.4

(58) Field of Classification Search
USPC ........ 405/154.1, 158, 168.1, 168.2, 171, 172, 405/184.4, 224, 224.1; 138/106, 111
See application file for complete search history.

(56) References Cited

U.S. PATENT DOCUMENTS

| | | | |
|---|---|---|---|
| 3,375,856 A * | 4/1968 | Howard et al. | 138/106 |
| 4,738,140 A * | 4/1988 | Kempf | 73/730 |
| 5,343,191 A | 8/1994 | McAtamney | |
| 7,546,224 B2 | 6/2009 | Campbell | |
| 2008/0232905 A1* | 9/2008 | Duroch et al. | 405/168.2 |
| 2011/0126637 A1 | 6/2011 | Dewall et al. | |
| 2011/0259115 A1* | 10/2011 | Roberts et al. | 73/800 |

FOREIGN PATENT DOCUMENTS

| | | | | |
|---|---|---|---|---|
| JP | 2003194666 | | 7/2003 | |
| WO | WO2009066157 | | 5/2009 | |
| WO | WO 2009/095657 | * | 8/2009 | G01M 5/00 |

* cited by examiner

*Primary Examiner* — Sean Andrish
*Assistant Examiner* — Carib Oquendo
(74) *Attorney, Agent, or Firm* — Karen R. DiDomenicis; Melissa Patangia

(57) ABSTRACT

Systems and methods are described for controlling axial, lateral and/or vertical movements of subsea pipelines which reduce the need for expensive pipeline anchoring or other mitigation solutions. The pipeline is connected to a stabilizing structure generally adjacent to the pipeline using a plurality of load-bearing members attached to the pipeline and the stabilizing structure at a plurality of predetermined locations. Also described are systems and methods for monitoring operating parameters of the pipeline over time.

11 Claims, 3 Drawing Sheets

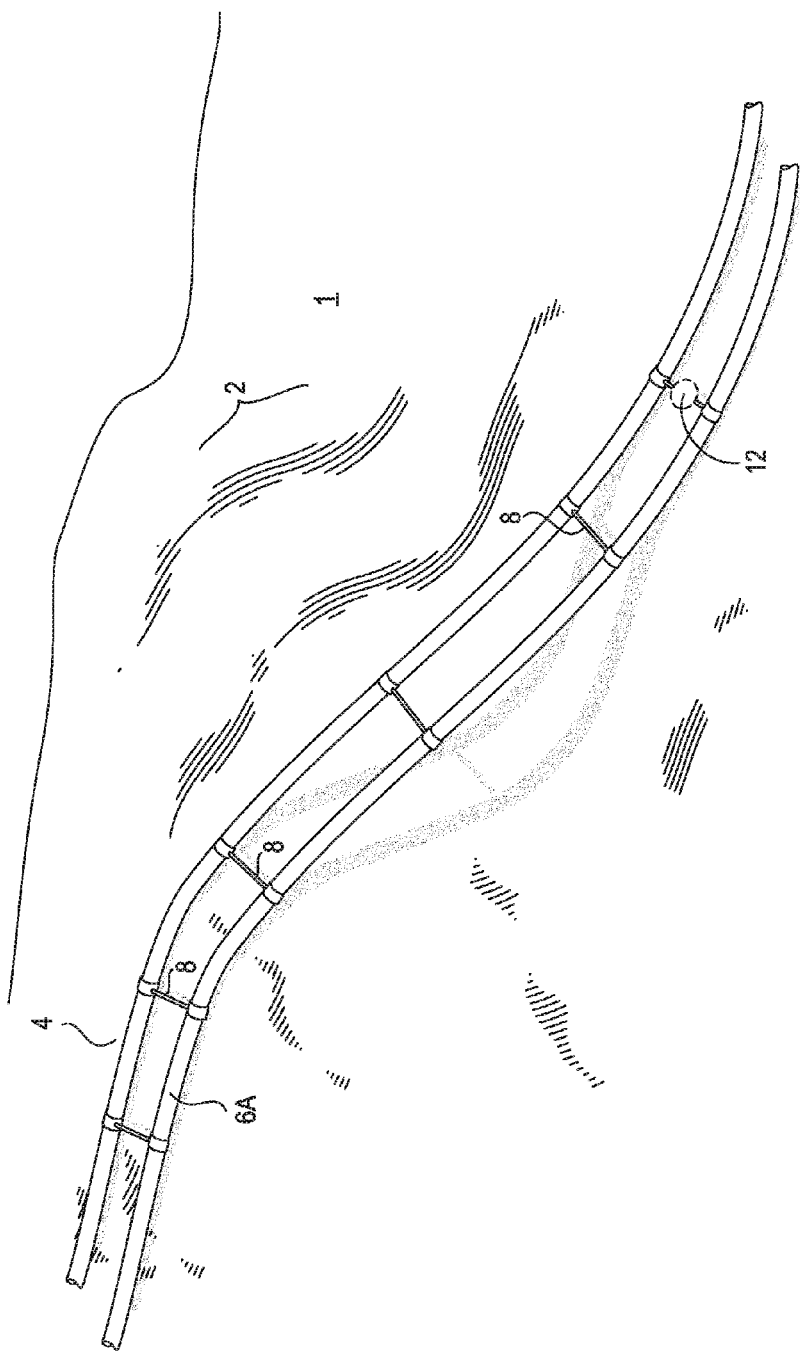

SYSTEM AND METHODS FOR STABILIZING SUBSEA PIPELINE

FIELD

The present disclosure relates to systems and methods for stabilizing a subsea pipeline such as an offshore hydrocarbon production pipeline. The present disclosure further relates to a system for monitoring a subsea pipeline over time.

BACKGROUND

Pipeline for offshore hydrocarbon production is installed on the seabed covering varying distances. Hydrocarbon well fluids carried by such pipeline can occur at high temperatures, e.g., greater than about 60° C., even up to about 200° C. Pipeline carrying such high temperature fluids experience thermal gradients across the pipeline during multiple shut downs and start ups resulting in expansion, contraction, and thermal cycling of the pipeline or conduit. This can result in a pipeline buckling in the lateral direction, displacement in the axial direction also referred to as "walking," and loading that leads to both static peak and cyclic stresses, which may induce overstrain failure and fatigue failure along the length of the pipeline at locations vulnerable to these undesired failure mechanisms. Walking is a very costly problem, as the junction of the pipeline with elements of the production facility infrastructure, such as for example, a pipeline end termination (PLET) or other subsea equipment, can be overstressed, resulting in damage and even parting of the pipeline from the equipment. Such incidents often require that hydrocarbon production be shut down so that the pipeline system can be repaired.

In order to prevent undesirable pipeline movement in the lateral and axial directions, expensive anchoring mitigation using large suction driven piles and the like is often employed to hold the pipeline in place. Various techniques for controlling buckle initiation such as the use of sections of buoyancy modules installed on a section of pipeline have also been employed to control buckling of pipeline in the lateral direction Implementation of such mitigation solutions tend to be costly and complex. Additionally, in order to monitor pipeline movement, periodic surveys are conducted by remotely operated vehicles (ROV's).

Additional challenges are presented when subsea pipelines are routed through uneven terrain. For instance, a subsea pipeline may run across canyons and scarps. In such instances, free spans or sections of pipeline in which the pipeline is not supported by underlying seabed can be subject to externally imposed loads by surrounding currents and waves as well as internally imposed loads caused by flow instability, e.g., slug flow. These internal and external effects can cause vibrations and other movements in the pipeline that can result in pipeline overstress and fatigue failure. Furthermore, geographical hazards involving soil movement can overstress existing unsupported spans and/or create new ones.

It would be desirable to have an economical solution for controlling axial and lateral movements of subsea pipelines which would reduce the need for expensive pipeline anchoring or other mitigation solutions. It would additionally be desirable to have a convenient solution for monitoring the subsea pipeline. It would further be desirable to have a simple and economical solution to limit or control vibrations and movements in unsupported spans of pipelines routed through uneven terrain or subject to undesirable soil movement.

SUMMARY

In one aspect, a method for stabilizing a subsea pipeline includes connecting a primary pipeline to a stabilizing structure generally adjacent to the primary pipeline at one or more predetermined locations along the length of the primary pipeline such that movement of the primary pipeline is restrained with respect to the stabilizing structure.

In another aspect, a system for conveying fluids on a seabed, the system includes a primary pipeline located on a seabed; a stabilizing structure located generally adjacent to the primary pipeline; and at least one load-bearing member having a first end adapted to attach to the primary pipeline and a second end adapted to attach to the stabilizing structure; such that when the at least one load-bearing member is attached to the primary pipeline and the stabilizing structure, movement of the primary pipeline is restrained with respect to the stabilizing structure.

BRIEF DESCRIPTION OF THE DRAWINGS

These and other objects, features and advantages of the present disclosure will become better understood with regard to the following description, appended claims and accompanying drawings where:

FIG. 3 is an illustration of a subsea production pipeline connected to a secondary line and traversing a large span in which it is unsupported by the seabed below the pipeline.

DETAILED DESCRIPTION

The present disclosure provides systems and methods to be described in detail hereinafter for stabilizing movement of a subsea pipeline, by which is meant a conduit located on a seabed. The terms "conduit," "pipeline" and "pipe" are used herein interchangeably.

Figure 1:
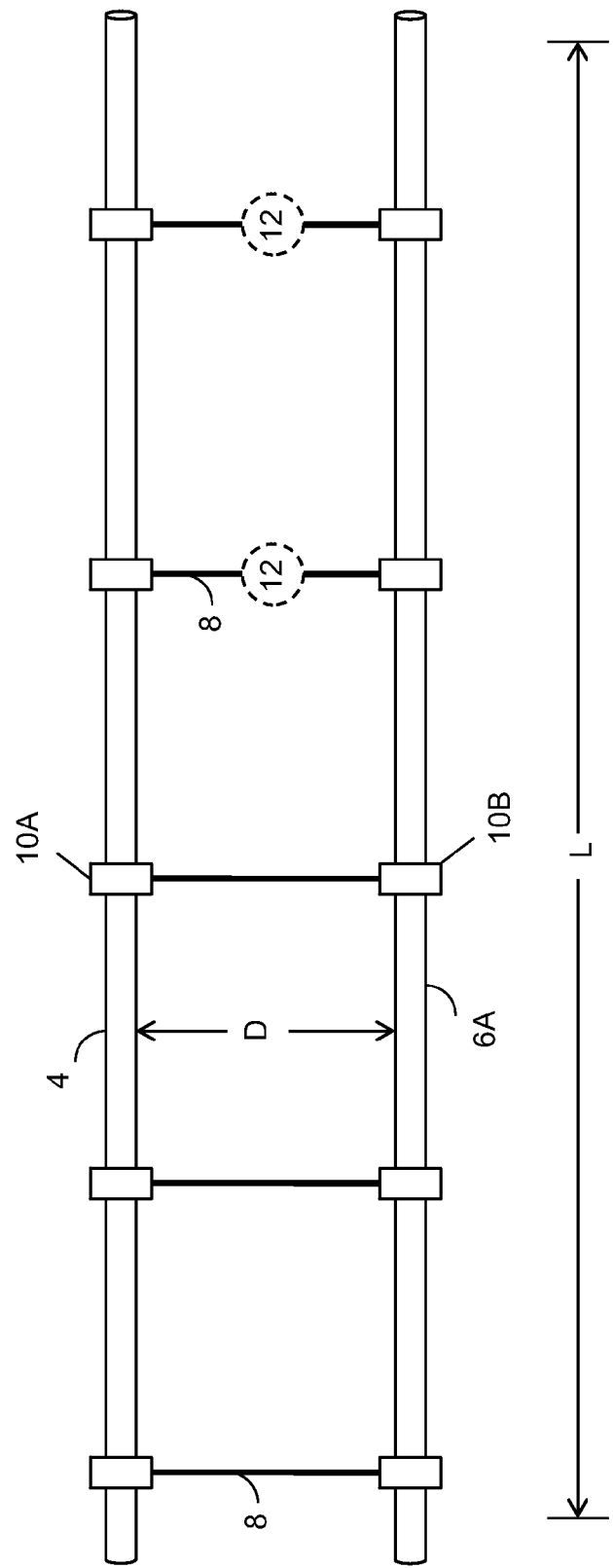
FIG. 1 is a schematic view of a primary subsea production pipeline connected to a secondary line as a stabilizing structure such that movement of the primary pipeline is restrained with respect to the secondary line according to one embodiment.

FIG. 1 is a schematic view (from an overhead perspective) of a system for stabilizing a subsea pipeline according to one embodiment. Illustrated is a primary subsea production pipeline 4 generally adjacent to a stabilizing structure in the form of a secondary line 6A. The production pipeline 4, also referred to as the primary pipeline 4, can convey fluids such as oil, water, chemicals and/or gas. By "generally adjacent" is meant that the primary pipeline 4 and the secondary line 6A are near one another over a desired length L. The two lines may or may not be parallel to one another. The length L can be at least about one kilometer, and even several hundred kilometers. The distance between the primary pipeline 4 and the secondary line 6A over this length is not so great that the two lines cannot be connected by some practical means, i.e., by at least one load-bearing member 8, to be described in more detail hereinafter. In some embodiments, the distance D between the primary pipeline 4 and the secondary line 6A over length L is from about 5 m to about 1000 m or more.

In the embodiment illustrated, the secondary line 6A can be a second pipeline for conveying fluids such as oil, water, chemicals and/or gas, a steel cable, an umbilical line or other generally adjacent secondary line as would be apparent to one skilled in the art. The secondary line 6A has sufficient load bearing capacity to stabilize the primary pipeline 4.

As nonlimiting examples, the number of load-bearing members used to connect the primary pipeline to a secondary line 6A can be at least one, even from 1 to about 100 or more, as needed to stabilize a desired length of pipeline. As nonlimiting examples, the load-bearing members can be generally spaced approximately 10 m to approximately 1000 m apart.

Figure 2:
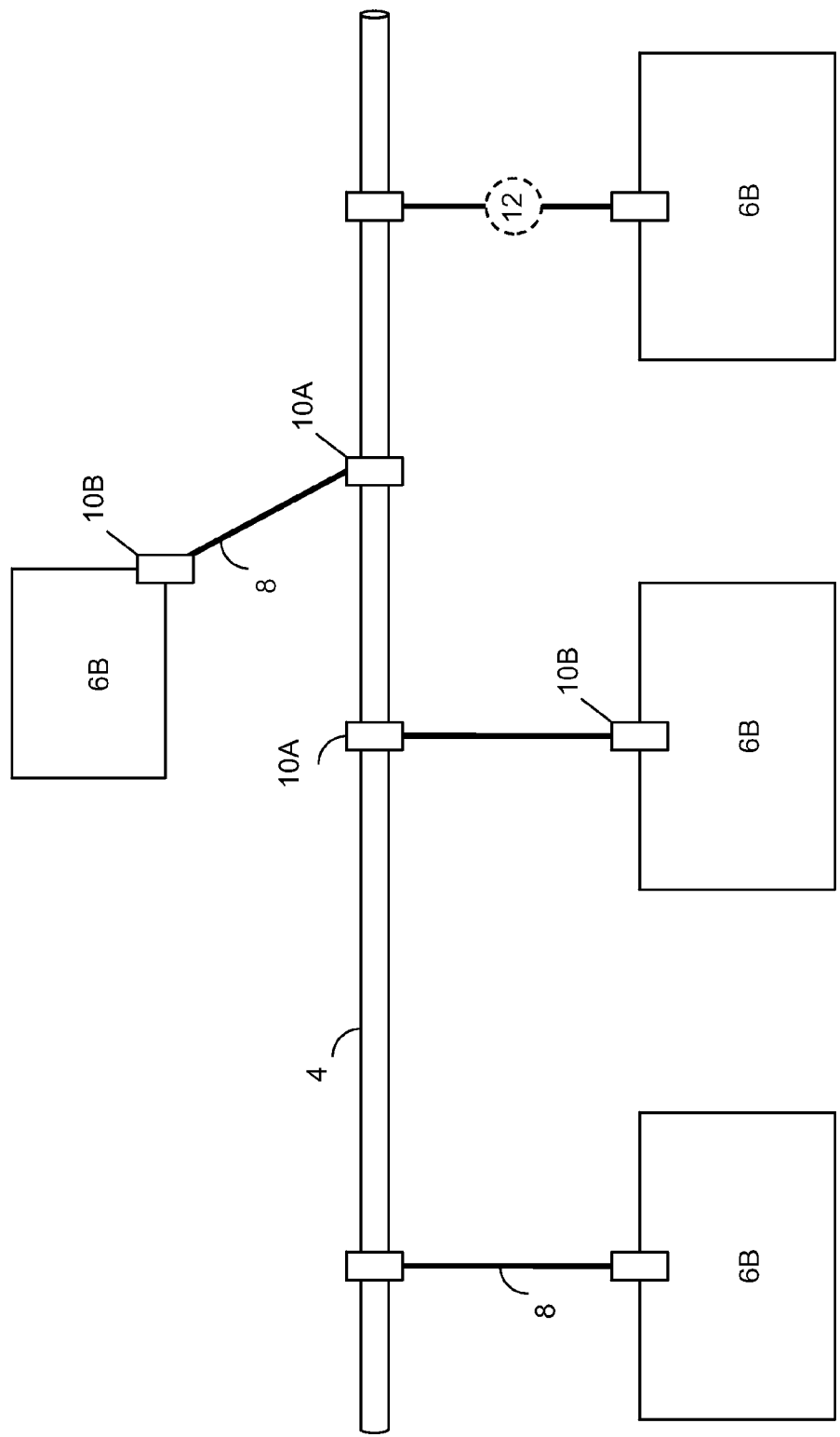
FIG. 2 is a schematic view of a primary subsea production pipeline connected to components of subsea equipment as a stabilizing structure such that movement of the primary pipeline is restrained with respect to the subsea equipment according to one embodiment.

FIG. 2 is a schematic view (from an overhead perspective) of a system for stabilizing a subsea pipeline according to another embodiment. In this embodiment, the stabilizing structure for stabilizing the primary pipeline 4 is at least one three-dimensional structure other than a secondary line referred to herein generally as equipment 6B. As described above, the equipment 6B is generally adjacent to the primary pipeline 4. In the embodiment illustrated, the equipment 6B can be any three-dimensional structure(s) having sufficient load bearing capacity to stabilize the primary pipeline 4. For instance, non-limiting examples of such structures include production platforms, pipeline end terminations (PLETs), manifolds, suction piles, wellheads, deadweights, steel cables and other generally adjacent stabilizing structures as would be apparent to one skilled in the art.

In the embodiments illustrated in both FIG. 1 and FIG. 2, the production pipeline 4 is connected to the stabilizing structure, i.e., the secondary line 6A in FIG. 1 and the equipment 6B FIG. 2 by way of at least one load-bearing member 8 located at one or more predetermined locations along the length of the primary pipeline 4. Each load-bearing member 8 is attached to the primary pipeline 4 at one end by way of a first attachment means 10A, and is attached to the stabilizing structure, i.e., the secondary line 6A or equipment 6B, at the other end by way of a second attachment means 10B.

The load-bearing member 8 can be any convenient means of connecting the primary pipeline 4 to the secondary line 6A or equipment 6B at one or more predetermined locations such that movement over time of the primary pipeline 4 is restrained and at least one desired direction with respect to the secondary line 6A or equipment 6B. For instance, the movement of the primary pipeline can be restrained in at least one of the axial direction, the lateral direction and the vertical direction with respect to the secondary line 6A or equipment 6B.

In one embodiment, the load-bearing member 8 can be selected from a tether (i.e., a cable formed of a flexible material), a steel cable, a chain, a pipe, a beam, an adjustable length jig and combinations thereof. Other suitable load-bearing members can be used as would be apparent to one skilled in the art. The load-bearing member can be formed of a material suitable for load-bearing application in a subsea environment, including, but not limited to steel, nylon, aromatic polyamide materials such as Kevlar® (available from E.I. du Pont de Nemours and Company, Wilmington, Del.), carbon fiber, polyester and other high tenacity polymeric materials.

The first attachment means 10A is adapted to attach to the primary pipeline 4, and the second attachment means 10B is adapted to attach to the secondary line 6A or equipment 6B. Nonlimiting examples of the first and second attachment means 10A and 10B are clamps, circumferential bands, straps, bolts, padeyes, shackles and the like. Other suitable attachment means can be used as would be apparent to one skilled in the art.

In some embodiments, the load-bearing member 8 can be used to monitor the primary pipeline over time. The load-bearing member can optionally incorporate a monitoring device 12 therein for this purpose. Monitoring devices 12 can be included in one or more of the load-bearing members 8. In some embodiments, a monitoring device such as a load cell assembly capable of measuring, recording, storing and/or communicating data related to operating parameters of the primary pipeline relative to the secondary line can be included in the load-bearing member. For example, such operating parameters can include tension in the primary pipeline, displacement of the primary pipeline, strain in the primary pipeline, rotation of the primary pipeline and position of the primary pipeline relative to the secondary line over time, as well as a timestamp associated with each measurement. The load cell assembly can include a load cell as well as optional processor(s) and transponder(s) useful for processing, storing and transmitting measured data. In one embodiment, the load-bearing member including the load cell assembly can be removed from the system after a period of time in use has elapsed and the data extracted. Such data can be analyzed by a processor which can calculate properties of interest, including, but not limited to, displacement of the primary pipeline, loads on the primary pipeline, strains in the primary pipeline and vibrations in the primary pipeline. Such properties and/or the data used to calculate such properties can further be displayed on a display means for visual observation as would be apparent to one skilled in the art.

In one embodiment, the load-bearing member can be removed from the system after a period of time in use has elapsed, and the load-bearing member can be tested to determine the load history. For instance, in one embodiment, the monitoring device 12 can be a mechanical strain gauge incorporated in the load-bearing member which can be inspected for physical changes indicating the amount of stress applied to the load-bearing member.

In one embodiment, the monitoring device 12 can be a sensor located in the load-bearing member to measure displacement or position of the primary pipeline for monitoring the pipeline over time. Nonlimiting examples of such sensors include accelerometers and transponders. The sensor can be incorporated into an assembly which further includes any suitable means for storing and/or communicating relevant information including position and displacement.

In some embodiments, the primary pipeline can run through an area of uneven terrain such that the pipeline must traverse one or more large spans in which the pipeline is unsupported by the seabed below. For instance, the pipeline may run over canyons, adjacent hills, scarps, or may run from a relatively flat area over a relatively steep incline in which the pipeline is not supported. In such situations, the unsupported pipeline may be subject to undesirable movements, vibrations and associated stresses caused by sea currents and/or disturbances in the flow through the pipeline, such as slug flow. As a result, the pipeline may be subject to fatigue and consequently reduced serviceable life. FIG. 3 illustrates a primary pipeline 4 and a secondary line 6A which run from a relatively flat area to a relatively high elevation over a steep incline 2 and a span in which the pipeline is not supported by the seabed 1. According to some embodiments, the primary pipeline 4 can be connected to the secondary line 6A to stabilize the primary pipeline as previously described herein by one or more load-bearing members 8. In such embodiments, by connecting the primary pipeline and the secondary line, both the primary pipeline and the secondary line can be stabilized. The unsupported span over which the pipeline is connected to the secondary line can vary between about 20 m and about 2000 m or more.

As a consequence of using the systems and methods described herein, incidence of undesirable events such as pipeline walking and development of higher than tolerable cumulative strains in the primary pipeline can be reduced or avoided. Pipeline failures and damage and associated need for expensive unplanned repairs can therefore also be reduced. In some embodiments, the systems and methods described herein are particularly beneficial when high temperature fluids are being conveyed by the primary pipeline, e.g., fluids from a hydrocarbon production well at a temperature from about 60° C. to about 200° C., as such high temperature fluids can result in undesirable pipeline movement. In some embodiments, the systems and methods described herein are particularly beneficial to stabilize a pipeline traversing a large span in which it is unsupported by the seabed below the pipeline.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "comprise," "include" and its variants, are intended to be non-limiting, such that recitation of items in a list is not to the exclusion of other like items that may also be useful in the materials, compositions, methods and systems of this invention.

From the above description, those skilled in the art will perceive improvements, changes and modifications, which are intended to be covered by the appended claims.

What is claimed is:

1. A method for stabilizing a subsea pipeline without the use of spikes for anchoring the primary pipeline to the seabed, comprising:

connecting a primary pipeline having a length and conveying fluids from a hydrocarbon production well at a temperature from about 60° C. to about 200° C. to a stabilizing structure generally adjacent to the primary pipeline at a plurality of predetermined locations along the length of the primary pipeline such that movement of the primary pipeline is restrained with respect to the stabilizing structure in at least one of the axial, lateral and vertical directions;

wherein the primary pipeline is connected to the stabilizing structure by attaching to the primary pipeline and the stabilizing structure a plurality of load-bearing members selected from tethers, cables, and chains, the load-bearing members each having a first end and a second end and wherein the first end comprises a first attachment means adapted to attach to the primary pipeline and the second end comprises a second attachment means adapted to attach to the stabilizing structure;

wherein the load-bearing member further comprises a load cell used in series with the load bearing member and capable of at least one of measuring, recording, storing, and communicating data related to movement of the primary pipeline over time.

2. The method of claim 1, wherein the primary pipeline and the stabilizing structure are located a distance of from about 5 m to about 1000 m from each other.

3. The method of claim 1, further comprising monitoring an operating parameter selected from at least one of tension in the primary pipeline, displacement of the primary pipeline, strain in the primary pipeline, rotation of the primary pipeline and position of the primary pipeline relative to the stabilizing structure.

4. The method of claim 1, further comprising processing said data to calculate at least one of displacements of the primary pipeline, loads on the primary pipeline, strains in the primary pipeline and vibrations in the primary pipeline.

5. The method of claim 1, wherein the primary pipeline spans a distance from about 20 m to about 2000 m over which the primary pipeline is unsupported by a seabed.

6. A system for conveying fluids on a seabed, the system comprising:

a. a primary pipeline located on the seabed conveying fluids from a hydro carbon production well at a temperature from about 60° C. to about 200° C.;

b. a stabilizing structure located generally adjacent to the primary pipeline; and c. a plurality of load-bearing members selected from tethers, cables and chains, the load-bearing members each load-bearing member having a first end adapted to attach to the primary pipeline and a second end adapted to attach to the stabilizing structure;

such that when the plurality of load-bearing members are attached to the primary pipeline and the stabilizing structure, movement of the primary pipeline is restrained with respect to the stabilizing structure without the use of spikes for anchoring the primary pipeline to the seabed;

wherein the load-bearing member further comprises a load cell used in series with the load-bearing member and capable of at least one of measuring, recording, storing, and communicating data related to movement of the primary pipeline over time.

7. The system of claim 6, wherein the first and second ends of the load-bearing member comprise attachment means selected from the group consisting of clamps, circumferential bands, straps, bolts, padeyes and shackles.

8. The system of claim 6, further comprising a processor for processing said data to calculate at least one of displacements of the primary pipeline, loads on the primary pipeline, strains in the primary pipeline and vibrations in the primary pipeline.

9. The system of claim 6, wherein the stabilizing structure is selected from at least one of a pipeline for conveying fluids, a cable and an umbilical line.

10. The system of claim 6, wherein the stabilizing structure is selected from at least one of pipeline end terminations, production platforms, manifolds, suction piles, wellheads and deadweights.

11. The system of claim 6, wherein the primary pipeline spans a distance from about 20 m to about 2000 m over which the primary pipeline is unsupported by the seabed.

* * * * *